United States Patent [19]

Horvath

[11] 4,317,612
[45] Mar. 2, 1982

[54] SIDEREAL TIME COMPENSATION DEVICE FOR ASTRONOMICAL TELESCOPE

[76] Inventor: Joseph Horvath, Rte 2, State Rd. 14, Box 309, Santa Fe, N. Mex. 87501

[21] Appl. No.: 138,036

[22] Filed: Apr. 7, 1980

[51] Int. Cl.³ .............................................. G02B 23/16
[52] U.S. Cl. ...................................................... 350/83
[58] Field of Search ................. 350/83, 84, 85; 74/53, 74/89

[56] References Cited

U.S. PATENT DOCUMENTS

| | | | |
|---|---|---|---|
| 2,326,552 | 8/1943 | Morse | 350/83 |
| 2,711,589 | 6/1955 | Stock | 350/83 |
| 2,896,476 | 7/1959 | Williams | 350/83 |
| 2,995,972 | 8/1961 | Baalson | 350/83 |
| 3,052,986 | 9/1962 | Mechant | 350/83 |
| 3,136,388 | 6/1964 | Jolly | 350/83 |
| 3,951,511 | 4/1976 | Parsons | 350/83 |
| 4,050,318 | 9/1977 | Wolf | 350/83 |

*Primary Examiner*—Jon W. Henry
*Attorney, Agent, or Firm*—Caesar, Rivise, Bernstein & Cohen, Ltd.

[57] ABSTRACT

An astronomical telescope having a polar axle for rotating the telescope about the polar axis at a predetermined speed and having sidereal time indicating means mounted on said axle and a pointer mounted adjacent to said means to indicate the rotational position of said axle with respect to said pointer. A sidereal time compensating device is mounted on the telescope and comprises a motor for rotation with said axle about the polar axis and gear means coupled to the sidereal time indicating means. The motor is engageable with the gear means to cause the gear means to rotate the time indicating means at a predetermined speed but in the opposite rotational direction as the rotation of the polar axle, whereupon the time indicating means remains at a fixed rotational position with respect to the pointer. The motor is arranged to be disabled so that when the gear means are engaged but the motor disabled, the rotation of the polar axle causes the concomitant rotation of the sidereal time indicating means. When the motor is disengaged from the gear means, the sidereal time indicating means can be adjusted to any rotational position with respect to the polar axle.

10 Claims, 5 Drawing Figures

SIDEREAL TIME COMPENSATION DEVICE FOR ASTRONOMICAL TELESCOPE

This invention relates generally to astronomical telescopes and more particularly to devices for use with a motor or clock-driven astronomical telescope for expediting the alignment of the telescope for observation of a celestial body at known coordinates.

Astronomical telescopes having means for moving the telescope about the polar or right ascention axis in synchronism with the movement of celestial bodies across the heavens have been disclosed in the patent literature and many are commercially available. Such telescopes include a clock or motor drive to move the telescope in synchronism with the motion of celestial bodies through space.

The location of a particular celestial body in space is accomplished by moving the telescope to the coordinates of the body as calculated from star charts. In order to facilitate the alignment of the telescope to the desired coordinates, commercially available telescopes frequently include a sidereal time indicating ring (sometimes referred to as a 24 hour circle), mounted for rotation with the polar axle and located adjacent to a fixed pointer to indicate the polar or right ascention coordinate. Such rings are mounted in a manner so that they can be rotationally adjusted with respect to the polar axle to enable one to calibrate the telescope for the local time at the observer's location so that conventional star charts (which are based upon Greenwich time) can be used.

As will be appreciated by those skilled in the art, when using conversational telescopes like those described above, it is necessary to calculate new coordinates from the star charts each time the telescope is aligned to a different celestial body since some finite time will have elapsed from the time that the telescope was initially aligned.

In U.S. Pat. No. 3,951,511 (Parsons) there is disclosed a telescope mount which includes sidereal time compensating means to facilitate the realignment of the telescope from one celestial body to another in accordance with the coordinates as set forth in the star charts and without necessitating calculations based on elapsed time. However, the mount disclosed in the Parsons patent has a number of drawbacks, the most significant of which is that the mount cannot be readily adapted for use with existing commercially available telescopes. In addition, the Parsons mount is relatively complex inasmuch as it makes use of a moving pointer which rotates around a sidereal time indicating circle and makes use of a relatively small polar axle. This latter fact limits the use of the mount to relatively small telescopes which do not require a massive polar axle to effect movement of the telescope.

Accordingly, it is the general object of the instant invention to provide a sidereal time compensation device which overcomes the disadvantages of the prior art.

It is a further object of the instant invention to provide a sidereal time compensation device which is adapted for use with conventional telescopes.

It is the further object of the instant invention to provide a sidereal time compensation device which is simple in construction and relatively low in cost.

It is a further object of the instant invention to provide a sidereal time compensating device which can be disengaged from a telescope to permit conventional operation.

It is a further object of this invention to provide a sidereal time compensation device which can be used on either fork-mount telescopes or German equatorial mount telescopes.

These and other objects of the instant invention are achieved by providing in an astronomical telescope having a mount, a rotatable shaft for carrying the telescope in a first rotational direction at a predetermined speed about a polar axis and an adjustable sidereal time indicating ring coupled to the shaft for rotation therewith and pointer means fixed with respect to the shaft for indicating the rotational position of the ring at any time, the improvement comprising sidereal time compensating means. The sidereal time compensating means comprises gear means coupled to the ring and motor means mounted for rotation with said telescope and engaging the gear means to cause the gear means to rotate the indicating ring at said predetermined speed but in the opposite rotational direction as the first rotational direction, whereupon when said shaft is rotated in said first rotational direction at the predetermined speed, the sidereal time indicating ring remains at a fixed rotational position with respect to the pointer.

Other objects and many of the attendant advantages of the instant invention will become better appreciated as the same becomes better understood by reference to the following detailed description when considered in connection with the accompanying drawing wherein:

FIG. 5 is an enlarged sectional view taken along line 5—5 of FIG. 3.

Figure 1:
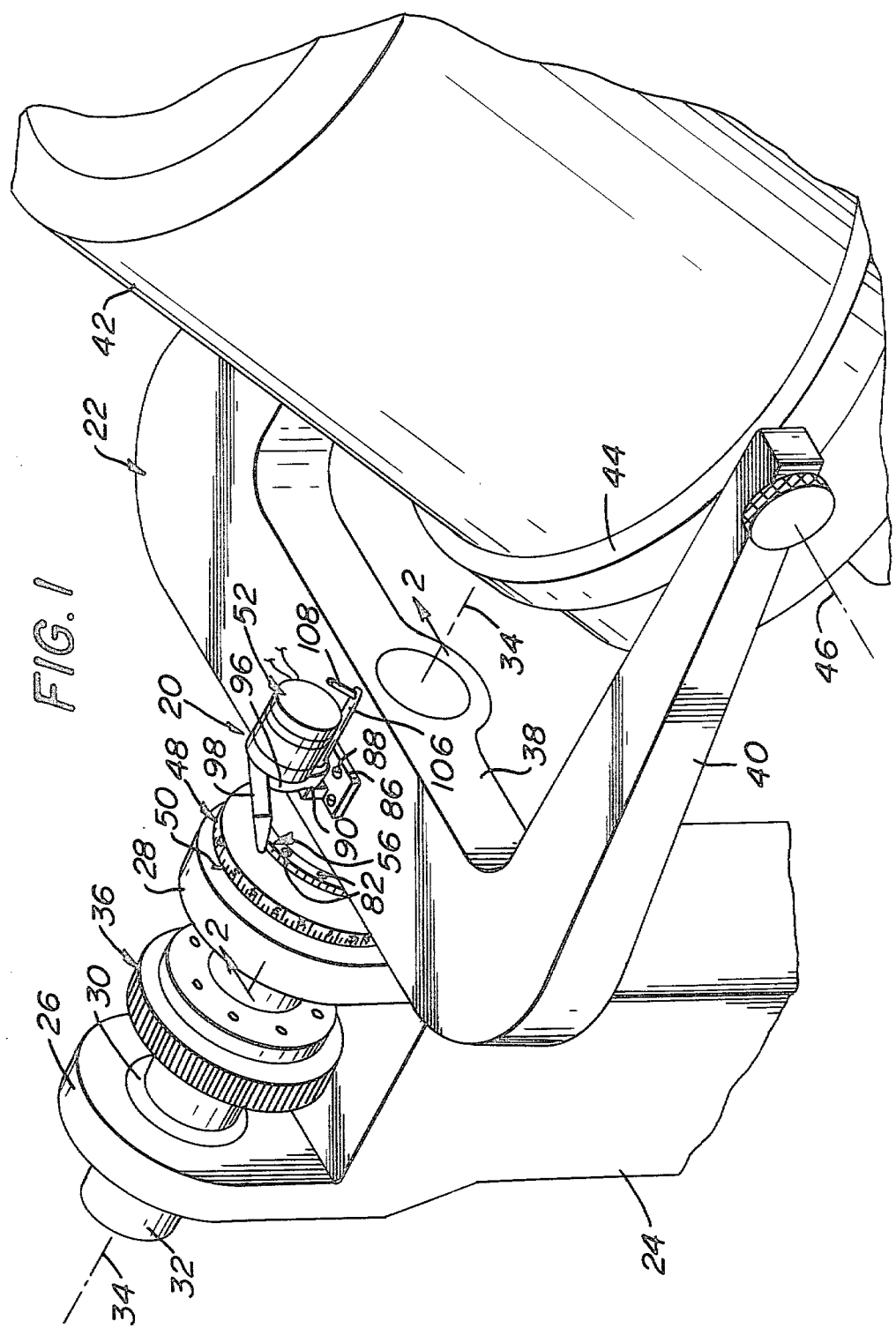
FIG. 1 is a perspective view of a portion of a conventional fork-type telescope including the sidereal time compensation device of the instant invention.

Referring now to the various figures of the drawing wherein like reference numerals refer to like parts, there is shown generally at 20 in FIG. 1 a sidereal time compensation device in accordance with the instant invention mounted on a conventional fork-type telescope 22.

Before considering the details of the sidereal time compensation device 20 of the instant invention, a brief discussion of the structure of the telescope 22 is in order.

The telescope 22 basically comprises a fixed support in the form of a pier 24. The pier 24 includes a pair of spaced mounting arms or brackets 26 and 28 projecting upward therefrom. The brackets each include a bearing sleeve 30 through which the right ascention (polar) axle or shaft 32 extends. The shaft 32 is oriented with respect to the mount 24 so that it is rotatable about its longitudinal axis which is the polar axis. The polar axis is designated by the reference numeral 34 in FIG. 1. The rotation of the polar axle 32 about the polar axis is accomplished via motor means (not shown) and an associated clutch and drive assembly 36. The clutch and drive assembly rotates the polar axle about the polar axis at a speed with synchronism with the movement of heavenly bodies through the sky. At the front end of the polar axle 32, there is mounted a fork or yoke 38 including a pair of arms 40 projecting forwardly parallel to the polar axis. The arms 40 serve to support the telescope's optic tube 42 via a mounting ring 44. Each arm is pivotably connected to the mounting ring by means (not shown) to enable the tube to be rotated about the declination axis 46 which is perpendicular to the polar axis 34.

A sidereal time indicating ring 48 is mounted on the polar axle 32 and includes indicia thereon indicating the 24 hours of a solar day. A pointer 50 is fixedly mounted on the bracket 28 adjacent to the location of the sidereal time ring 48.

As will be appreciated by those skilled in the art, the sidereal time ring 48 is adjusted, that is, rotated, with respect to the polar axis 32 to calibrate the telescope for observing a particular heavenly body after calculating local time from conventional star charts which are based on Greenwich time. Once the telescope has been aimed at a particular star and the motor (not shown) of the clock drive 36 initiated, the telescope will rotate about the polar axis 34 to track the star. The rotation of the polar axle 32 causes the concomitant rotation of the sidereal time ring 48 with respect to the fixed pointer 50 to indicate the amount of time which has elapsed from the initial alignment on the star.

The sidereal time compensation device 20 of the instant invention enables one to reset the telescope to any coordinates without necessitating recalculation once the telescope has been aligned with a celestial body on known coordinates. This action is accomplished by the immobilization of the 24 hour circle with respect to the pointer 50 while the telescope continues to rotate about the polar axis 34. Thus, all during observation of the first celestial body time effectively stands still as far as the 24 hour circle is concerned. The device 20 is also arranged to enable the 24 hour circle 48 to rotate with the rotation of the polar axle to indicate elapsed time, as is conventional, if such action is desired. Moreover, the device 20 can be disengaged from the 24 hour circle to enable the adjustment of the 24 hour circle with respect to the polar axle 32 to initially align the telescope.

Figure 2:
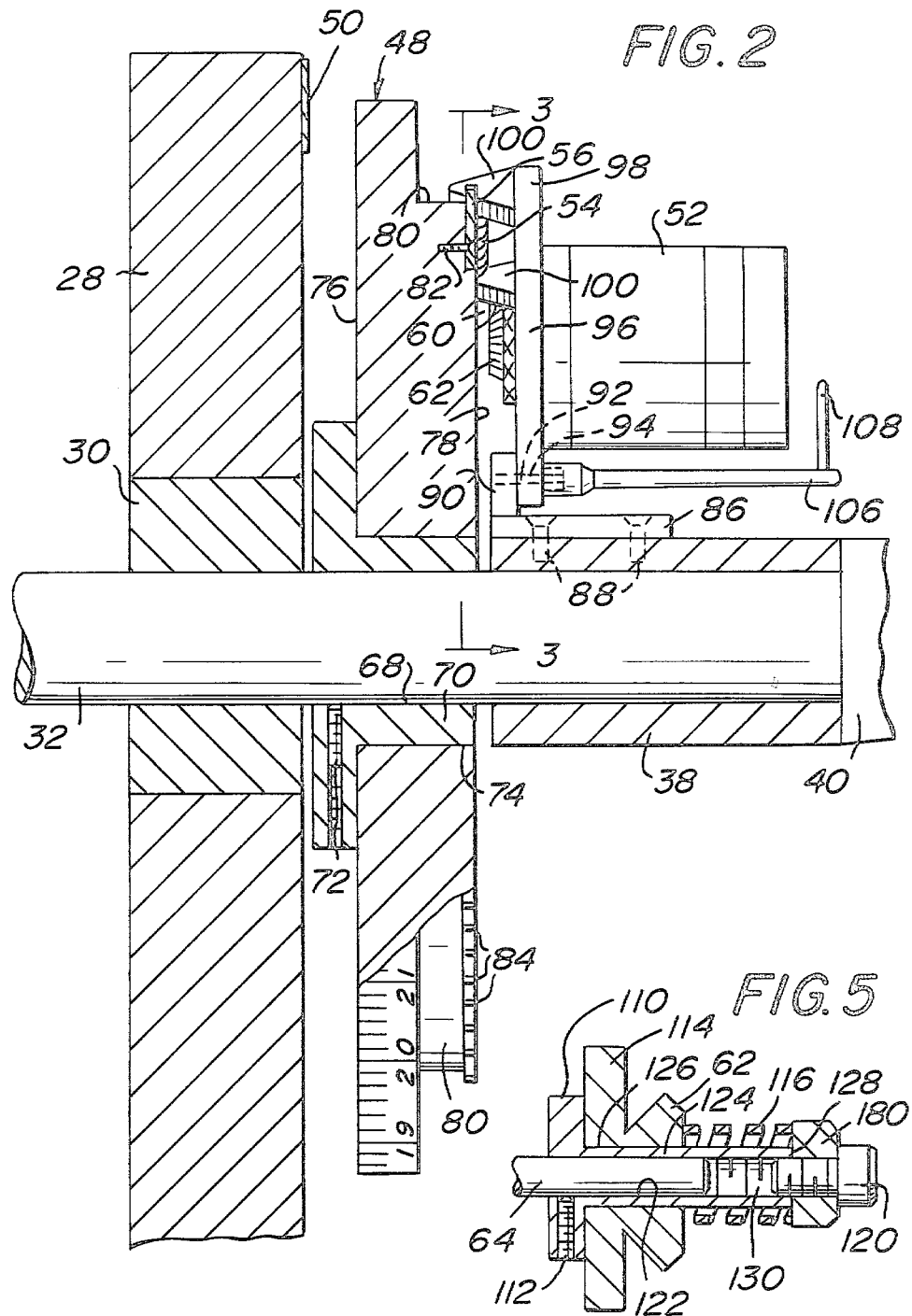
FIG. 2 is an enlarged sectional view taken along line 2—2 of FIG. 1.
Figure 3:
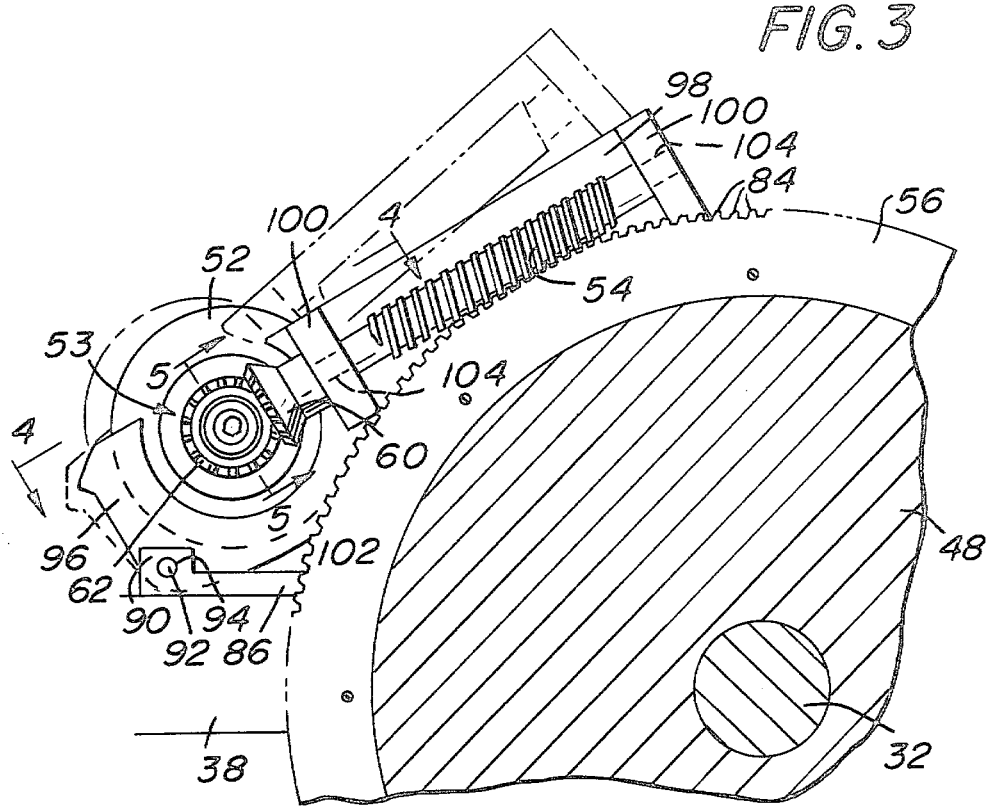
FIG. 3 is a sectional view taken along line 3—3 of FIG. 2.
Figure 4:
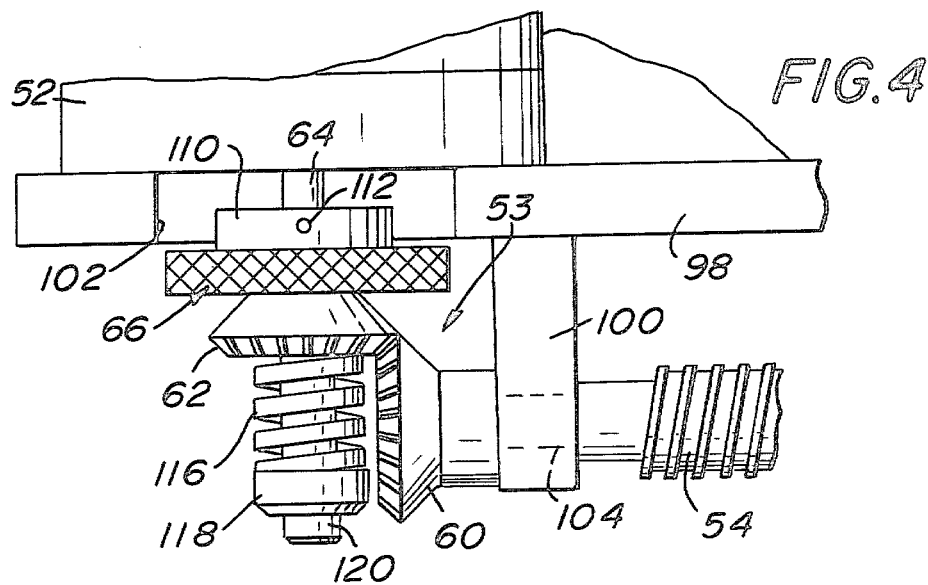
FIG. 4 is an enlarged view taken along line 4—4 of FIG. 3.

The construction of device 20 of the instant invention will best be appreciated by reference to FIGS. 2 and 3. As can be seen therein, the device 20 basically comprises a motor 52 and an associated gear train 53 (to be discribed later). The motor is an electric motor which is powered via conductors from a power source, e.g., 110 V outlet (not shown). The motor includes control means (not shown) to energize it when desired. The gear train 53 comprises a worm gear 54, a gear ring 56 fixedly mounted with respect to the 24 hour circle 48 and a pair of cooperating bevel gears 60 and 62. The worm gear 54 is arranged for releasable engagement with the gear ring 56. The bevel gear 62 is mounted on the rotary output shaft 64 of the motor 52 via vernier adjustment means 66 (FIG. 4).

The manner in which the 24 hour circle is mounted on the right ascention or polar axle 32 is shown in detail in FIG. 2. To that end, as can be seen therein, the axle 32 extends through the sleeve bearing 30 in the mounting bracket 26 of the pier 24. The forward end of the axle 32 extends through an opening 68 in a hub 70. The hub is a flanged member fixedly secured to the shaft 32, via a set screw 72. The 24 hour circle 48 is basically a disk-like member having a central opening 74 through which the hub 70 extends. The outer periphery of the disk 48 contiguous with the rear surface 76 is divided equally in twenty-four hour segments with interposed fractional hour indicia.

The front surface 78 of the disk includes an annular ledge 80 in the periphery thereof. The ring gear 56 comprises a toothed ring mounted contiguous with the ledge 80, via plural threaded fasteners 42 extending into the front face 78 of the disk. The outer periphery of the ring 56 includes a large multitude of gear teeth 84 (FIG. 3). When mounted on the 24 hour circle disk 48, the ring gear 56 teeth 84 project outward beyond the periphery of the ledge 80 for engagement with the teeth of the worm gear 58.

In the interest of precision, the 24 hour circle 48 fits closely on the fixed hub 70 but can be rotated with respect thereto and hence with respect to the polar axle 32.

In accordance with the teachings of this invention, the motor 52 can be mounted on any portion of the telescope which rotates with the polar axle. In the fork-type telescope mount shown in the drawings herein, the motor 52 is conveniently mounted on the fork or yoke 38. In the German equatorial mount telescope, the motor is preferably mounted directly on the polar axle adjacent to the support pier.

The mounting of the motor on the fork 38 of the telescope shown in FIG. 1 is accomplished via a bracket assembly 84. The bracket assembly 84 comprises a fixed bracket permanently secured to the surface of the yoke 38 contiguous with the forward end of the polar axle 32, via plural thread fasteners 88. The fixed bracket includes an upstanding support 90 having a pivot pin 92 extending therethrough. The pivot pin extends through an opening 94 in a mounting plate 96 forming the other portion of the bracket assembly 84. The plate 96 is a planar member to which the motor is permanently secured and terminates in a outwardly projecting arm 98. The arm 98 serves to support the worm gear 58.

As can be seen in FIG. 3, the arm 98 is an elongated extension having a finger 100 projecting normally at the free end thereof and a similar projection 100 projecting normally from the point at which the arm merges with the plate portion 96. The fingers 100 each include an aligned opening 104 in which the worm gear 58 is journaled. The bevel gear 60 is fixedly secured to the worm gear 54 adjacent to finger 100. The bracket plate 96 with the motor and interconnected worm gear 58 mounted thereon is arranged to be pivoted about pin 92 from a retracted position, shown by the phantom lines in FIG. 3 to an extended position as shown in full therein. In the extended position, the teeth of the worm gear 58 engage the teeth 84 of the ring gear 56. In the retracted position, the worm gear is disengaged from the ring gear.

The pivotable bracket plate 96 can be locked in either the extended or retracted position, via the use of a locking lever 106. The lever 106 is threadedly engaged on one end of the pivot pin 92 so that when the lever 106 is rotated via its handle 108, the pivoting plate portion 96 is frictionally engaged with the upstanding portion 90 of the bracket to prevent any pivoting of the plate. When the lever is rotated in the opposite direction to release the frictional engagement between the portion 90 and plate 96, the plate can be pivoted to the desired position.

As can be seen in FIG. 3, the pivoting plate 96 includes a recess 102 through which the output shaft 64 of the motor extends for connection, via the vernier adjusting means 66, to the bevel gear 62. The bevel gear 62 engages the bevel gear 60 normally to impart the rotational motion of the motor output shaft 64 to the worm gear 58, whereupon the worm gear rotates about its longitudinal axis.

When the worm gear 58 is in the extended position shown in FIG. 3, its rotation causes the 24 hour circle disk 48 to rotate about hub 70, via the engagement of the worm gear 58 and ring gear 56.

As mentioned heretofore, the sidereal time compensating device 20 of the instant invention is arranged to effect the rotation of the 24 hour circle disk 48 about the hub 70 in the opposite rotational direction, but at the same rotational speed, as the polar axle 32 is rotated about the polar axis by the clock drive. Accordingly, the 24 hour circle remains fixed in space with respect to the fixed pointer 50. This action has the effect of making time stand still insofar as the 24 hour circle is concerned. Therefore, all that is required to move the telescope to observe a different celestial body is to rotate the polar axle, and hence the telescope, until the new polar coordinate, as set forth in the astronomical charts, is indicated by the pointer 50 on the 24 hour circle. The telescope tube 42 must, of course, be rotated about the declination axis 46 to the new declination coordinate. However, no calculations need to be made for the polar coordinate to compensate for elapsed time since the initial alignment of the telescope. It will, of course, be apparent to those skilled in the art that during the reorientation from the observation of one celestial object to another, the sidereal time compensating motor 52 must remain on and the worm gear engaged with the ring gear to automatically compensate for the time which elapses during the reorientation of the telescope.

If it is desired to have the 24 hour circle rotate with the polar axle 32 to provide an indication of elapsed time, the gear 56 is allowed to remain in the extended position shown in FIG. 3 but the motor 52 is deenergized so that it ceases rotating shaft 64. This action effectively fixedly secures the 24 hour circle disk 48 to the fork 38, which is in turn fixedly secured to the rotating polar axle 32. Accordingly, the 24 hour circle 48 rotates in unison with the polar axle 32 to provide a reading of elapsed time, via the position of the pointer 50 with respect to the disk 48.

When it is desired to adjust the rotational position of the 24 hour circle 48 with respect to the polar axle 32 to calibrate the telescope for an initial observation, the locking lever 106 is released to enable the worm gear 58 to be pivoted to the retracted position out of engagement with the gear ring 56. This action frees the disk 48 on the hub 70 to allow the disk to be rotated to any relative angular orientation with respect to the polar axle 32. Thus, after one has calculated the desired coordinates based upon local time the telescope can be rotated about the polar axis until the pointer 50 is aligned with the desired polar coordinate on the 24 hour circle. The tube 42 is then positioned at the desired declination coordinate. The worm gear is then pivoted into engagement with the ring gear and the motor 52 and clock drive 36 are energized to commence tracking of the celestial body across the sky.

In order to provide minute or vernier adjustment between the output shaft of the motor 52 and the associate gears to enable precise positioning of the telescope to a polar coordinate, the device 20 includes the vernier adjustment means 66 mentioned heretofore. The vernier adjustment means 66 is basically a clutch type mechanism and will best be understood by reference to FIG. 5. To that end, as can be seen in FIG. 5, the vernier adjustment means 66 basically comprises a flanged hub 110, a locking screw 112, a knurled hand knob 114 which is integral with the bevel gear 62, a helical spring 116, a retaining washer 118 and a retaining screw 120. The hub 110 is a tubular body having a central passageway 122 into which the free end of the motor shaft 64 extends. The locking screw extends through a threaded hole in the flange portion of the hub for engagement with the motor shaft 64 to lock the hub in place thereon. The hub includes a tubular front portion 124 which extends through a central opening 126 in the hand knob 114, and bevel gear 62 and through the helical spring 116. The retaining washer is mounted on the free end 130 of the hub 110 and is held in place by retaining screw 120 which extends through an opening in the washer and into a suitably threaded portion of the central bore 122. The spring 116 is a compression type spring so that when the retaining washer and screw is tightened, the spring 116 is compressed between the retaining washer and the front face of the bevel gear 62. This causes frictional engagement between the abutting surfaces of the hand knob 114 and the flange portion of the hub 110.

Operation of the vernier adjusting means 66 is as follows: With the motor 52 is deenergized so that the shaft 64 is stationary, the hand knob 114 is gripped, via its outer knurled surface. If the hand knob is pushed forward, that is toward the retaining washer 118, at the same time that it is rotated with respect to the hub 110, the bevel gear is rotated with respect to the hub 124, and hence to the shaft 64. Accordingly, the coacting bevel gear 62 and associated worm gear and ring gear are also rotated to adjust the position of the twenty-four hour circle 48 with respect to the motor shaft 64. Release of the hand knob causes the spring 116 to move the hand knob into frictional engagement with the hub's flange thereby securing the rotary position of the bevel gear 62 with respect to the shaft 64.

As will be appreciated from the foregoing, the sidereal time compensating device of the instant invention is relatively simple in construction, can be made at low cost, and is readily adaptable to most popular telescope mounts, e.g, fork or yoke mounts. German equatorial mounts, etc. The device enables one to achieve accurate setting capabiities while eliminating all calculations between Greenwich and local time for each observation of a different celestial body once the telescope has been set or calibrated to the coordinates of one celestial body. Moreover, the device of the instant invention has wide utility since it can be operated so that the 24 hour circle rotates in synchronism with the rotation of the polar axle, to thereby provide an indication of elapsed time as found in conventional telescopes.

Without further elaboration, the foregoing will so fully illustrate my invention that others may, by applying current or future knowledge, readily adapt the same for use under various conditions of service.

What is claimed as the invention is:

1. In an astronomical telescope having a mount, a rotatable shaft for carrying the telescope in a first rotational direction at a predetermined speed about the polar axis, an adjustable, sidereal time indicating means coupled to said shaft for rotation therewith and pointer means fixedly secured to said mount and disposed adjacent to said indicating means for indicating the rotational position of said indicating means at any time, the improvement comprising gear means coupled to said indicating means and motor means mounted for rotation with said shaft for engaging said gear means to cause said gear means to rotate said indicating means at said predetermined speed but in the opposite rotational direction as said first direction, whereupon when said shaft is rotated in said first rotational direction at said predetermined speed, said indicating means remains at a fixed rotational position with respect to said pointer means.

2. The telescope of claim 1 wherein said motor means is disengageable from said gear means to enable adjustment of said indicating means with respect to said shaft.

3. The telescope of claim 2 wherein said motor means is arranged to be selectively deenergized whereupon engagement of said motor, when deenergized, to said indicating means causes said indicating means to rotate in unison with said shaft in said first rotational direction at said predetermined speed.

4. The telescope of claim 3 wherein said motor includes a rotatable output shaft and wherein said gear means includes vernier means for adjusting the relative rotational position between said output shaft and said indicating means.

5. The telescope of claim 4 wherein indicating means comprises a ring and said gear means comprises a circular gear ring fixedly secured to said indicating ring and a worm gear for releasably engaging said ring gear, said vernier adjusting means comprising clutch means connected between said output shaft and said worm gear.

6. The telescope of claim 5 wherein said motor, vernier adjusting means and worm gear are mounted on a bracket for movement from a first position, wherein said worm gear is disengaged from said ring gear, to a second position wherein said worm gear engages said ring gear.

7. The telescope of claim 6 wherein said bracket is pivotable from said first position to said second position.

8. The telescope of claim 7 including releasable locking means for locking said bracket in either of said positions.

9. The telescope of claim 8 wherein said motor comprises an electrical motor.

10. The telescope of claim 9 wherein said telescope includes a yoke and wherein said bracket is mounted on said yoke.

* * * * *